US012555514B2

(12) United States Patent
Chang

(10) Patent No.: US 12,555,514 B2
(45) Date of Patent: Feb. 17, 2026

(54) DRIVING CIRCUIT FOR DISPLAY PANEL

(71) Applicant: FORCELEAD TECHNOLOGY CORP., Jhubei (TW)

(72) Inventor: Ching-Tsun Chang, Jhubei (TW)

(73) Assignee: ForceLead Technology Corp., Jhubei (TW)

( * ) Notice: Subject to any disclaimer, the term of this patent is extended or adjusted under 35 U.S.C. 154(b) by 0 days.

(21) Appl. No.: 17/804,974

(22) Filed: Jun. 1, 2022

(65) Prior Publication Data

US 2023/0117350 A1 Apr. 20, 2023

Related U.S. Application Data

(60) Provisional application No. 63/195,365, filed on Jun. 1, 2021.

(51) Int. Cl.
*G09G 3/20* (2006.01)
*G09G 3/30* (2006.01)

(52) U.S. Cl.
CPC ............. *G09G 3/30* (2013.01); *G09G 3/2074* (2013.01); *G09G 2310/08* (2013.01);
(Continued)

(58) Field of Classification Search
CPC ......................... G09G 3/30; G09G 2320/0233
See application file for complete search history.

(56) References Cited

U.S. PATENT DOCUMENTS 7,227,519 B1 * 6/2007 Kawase ............... G09G 3/2081 345/77
8,884,854 B2 * 11/2014 Taneda ................. G09G 3/3233 345/82

(Continued)

FOREIGN PATENT DOCUMENTS

CN 106328030 A 1/2017
CN 107195280 A 9/2017

(Continued)

OTHER PUBLICATIONS

First Office Action mailed to Taiwanese Counterpart Patent Application No. 111120525 on May 16, 2023.

(Continued)

*Primary Examiner* — Gene W Lee
(74) *Attorney, Agent, or Firm* — Rosenberg, Klein & Lee

(57) ABSTRACT

The present application relates to a driving circuit for display panel, comprising a compensation module and a driving module. The compensation module generates a first compensation signal according to variation of a first displaying characteristic of a first image in a frame time. The driving module generates a first driving signal according to the first compensation signal for driving the display panel to display the first image in a first frame time. By avoiding excessive variation of displaying characteristics of the first image with time, the displaying quality may be improved. In addition, the compensation module generates a second compensation signal according to the difference between the first displaying characteristic of the first image and a second displaying characteristic of a second image. The driving module drives the display panel to display the second image in a second frame time according to the second compensation signal. Accordingly, the influence on displaying quality owing to excessive difference in displaying characteristics between the first image displayed in the first frame time and the second image displayed in the second frame time may be avoided.

6 Claims, 14 Drawing Sheets

(52) U.S. Cl.
CPC . *G09G 2320/02* (2013.01); *G09G 2320/0233* (2013.01); *G09G 2320/0626* (2013.01)

(56) References Cited

U.S. PATENT DOCUMENTS

| | | | | |
|---|---|---|---|---|
| 9,711,106 | B1 * | 7/2017 | Wang | G09G 3/006 |
| 10,083,643 | B2 * | 9/2018 | Kondo | G09G 3/20 |
| 10,867,549 | B2 * | 12/2020 | Xuan | G09G 3/3233 |
| 11,972,725 | B2 * | 4/2024 | Zhou | G09G 3/3233 |
| 2005/0285822 | A1 * | 12/2005 | Reddy | H10K 65/00 345/76 |
| 2006/0022914 | A1 * | 2/2006 | Kimura | G09G 3/2014 345/76 |
| 2015/0348463 | A1 * | 12/2015 | Lee | G09G 3/3233 345/212 |
| 2019/0180695 | A1 | 6/2019 | Ha et al. | |
| 2020/0175923 | A1 | 6/2020 | Kim | |
| 2022/0036840 | A1 * | 2/2022 | Zhao | G09G 3/3685 |
| 2022/0343825 | A1 * | 10/2022 | Ha | G09G 5/06 |

FOREIGN PATENT DOCUMENTS

| | | | |
|---|---|---|---|
| CN | 107578746 | A | 1/2018 |
| CN | 108806623 | A | 11/2018 |
| CN | 110751933 | A | 2/2020 |
| CN | 111312191 | A | 6/2020 |
| CN | 111540331 | A | 8/2020 |
| CN | 111640390 | A | 9/2020 |
| CN | 111883079 | A | 11/2020 |
| CN | 112687234 | A | 4/2021 |
| CN | 112767867 | A | 5/2021 |
| CN | 112863433 | A | 5/2021 |

OTHER PUBLICATIONS

First Search Report mailed to Taiwanese Counterpart Patent Application No. 111120525 on May 16, 2023.
Office Action mailed to Corresponding Taiwanese Patent Application No. 202210618937 dated Jan. 17, 2025.
Search Report mailed to Corresponding Taiwanese Patent Application No. 202210618937.
Office Action mailed to Corresponding Chinese Patent Application No. 202210618937.X dated May 31, 2024.
Search Report mailed to Corresponding Chinese Patent Application No. 202210618937.X dated May 31, 2024.

* cited by examiner

DRIVING CIRCUIT FOR DISPLAY PANEL

FIELD OF THE INVENTION

The present application relates generally to a driving circuit, and particularly to a driving circuit for a display panel capable of improving the displaying quality.

BACKGROUND OF THE INVENTION

Display panels are indispensable equipment in modern electronic products. With the increasing refresh frequency of current display panels, the range of dynamic refresh frequency is increased. In the power saving mode, the refresh frequency of display panels will be decreased. A low refresh frequency causes the displaying characteristics of the image to vary with time. For example, the luminance will decrease with time. This nonuniformity of luminance with time affects the displaying quality. In addition, a large range of dynamic refresh frequency also result in variations of the displaying characteristics of the image with time. For example, users will see flickers.

To solve the above problems, the present application provides a driving circuit for preventing large variation of displaying characteristics with time and thus improving displaying quality. Besides, by avoiding excessive difference in displaying characteristics between two images displayed in two frame times, the displaying quality may be enhanced as well.

SUMMARY

An objective of the present application is to provide a driving circuit for display panel, which adjusts the driving signal according to the variation of displaying characteristics between images displayed in frame times for avoiding excessive difference in displaying characteristics with time and thus improving the displaying quality.

An objective of the present application is to provide a driving circuit for display panel, which adjusts the driving signals according to the difference of displaying characteristics between two images for avoiding excessive difference in displaying characteristics between two images of two frame times and hence enhancing the displaying quality.

The present application discloses a driving circuit for display panel, which comprises a compensation module and a driving module. The compensation module generates a first compensation signal according to the variation of a first displaying characteristic of a first image in a frame time. The driving module generates a first driving signal according to the first compensation signal for driving the display panel to display the first image in a first frame time.

The present application further discloses another driving circuit for display panel, which comprises a compensation module and a driving module. The compensation module generates a compensation signal according to the difference between a first displaying characteristic of a first image and a second displaying characteristic of a second image. The driving module generates a first driving signal for driving the display panel to display the first image in a first frame time and a second driving signal according to the compensation signal for driving the display panel to display the second image in a second frame time.

DETAILED DESCRIPTION

In order to make the structure and characteristics as well as the effectiveness of the present application to be further understood and recognized, the detailed description of the present application is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
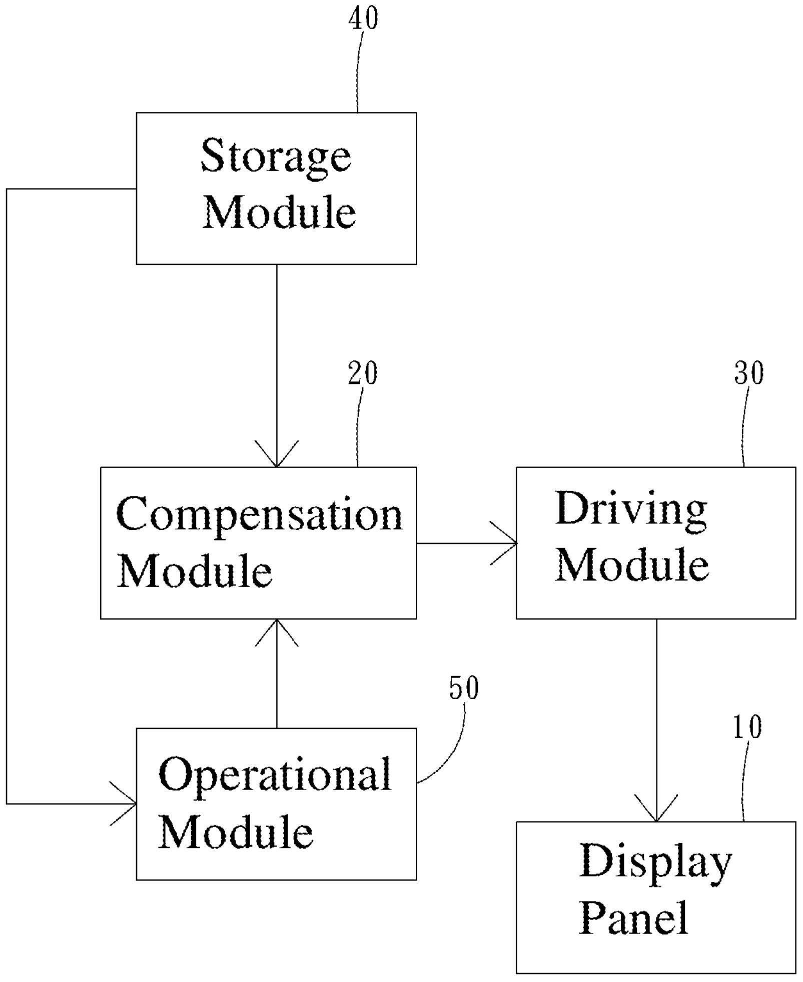
FIG. 1 shows a block diagram of the driving circuit for display panel according to an embodiment of the present application.

Please refer to FIG. 1, which shows a block diagram of the driving circuit for display panel according to an embodiment of the present application. As shown in the figure, the driving circuit according to the present application is used for driving a display panel 10 to display images. The driving circuit comprises a compensation module 20, a driving module 30, a storage module 40, and an operational module 50. The compensation module 20 is coupled to the driving module 30, generates a first compensation signal according to the variation of a first displaying characteristic of a first image in a frame time, and transmits the first compensation signal to the driving module 30. The driving module 30 generates a first driving signal according to the first compensation signal for driving the display panel 10 to display the first image at a first frame time.

Figure 2:
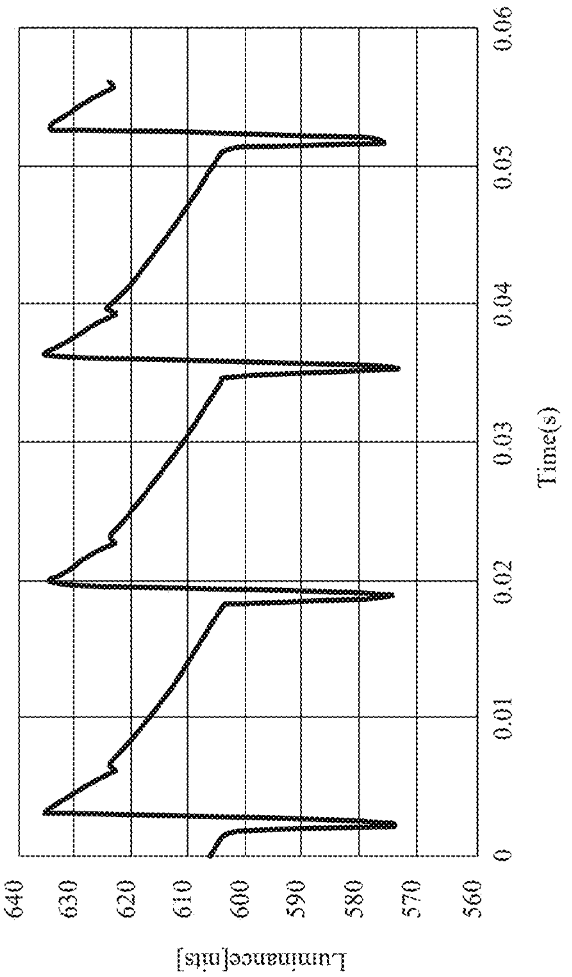
FIG. 2 shows a schematic diagram of displaying characteristics of the images according to the present application.

Please refer to FIG. 2, which shows a schematic diagram of displaying characteristics of the images according to the present application. FIG. 2 illustrates the displaying characteristics of images displayed on a pixel on the display panel 10 in three frame times. According to the present embodiment, the displaying characteristic is the luminance. The images corresponds to the same image data, for example, identical gray levels. As shown in FIG. 2, in each frame time, the luminance of the image will decay with time. Namely, the displaying characteristic varies with time, and thus affecting the displaying quality. Different image data of the display panel 10 correspond to different displaying characteristics of image. In other words, the variation of a displaying characteristic in a frame time will be different for different image data. According to the present application, the variation of the displaying characteristics of images corresponding to different image data in a frame time is regarded as reference data of displaying characteristics. That is to say, the reference data of displaying characteristics include the variation of displaying characteristics of the images in a frame time. For example, once the values of displaying characteristics at each time are recorded, the variation will be obtained. According to an embodiment of the present application, the displaying characteristic may be the chromacity.

Figure 3:
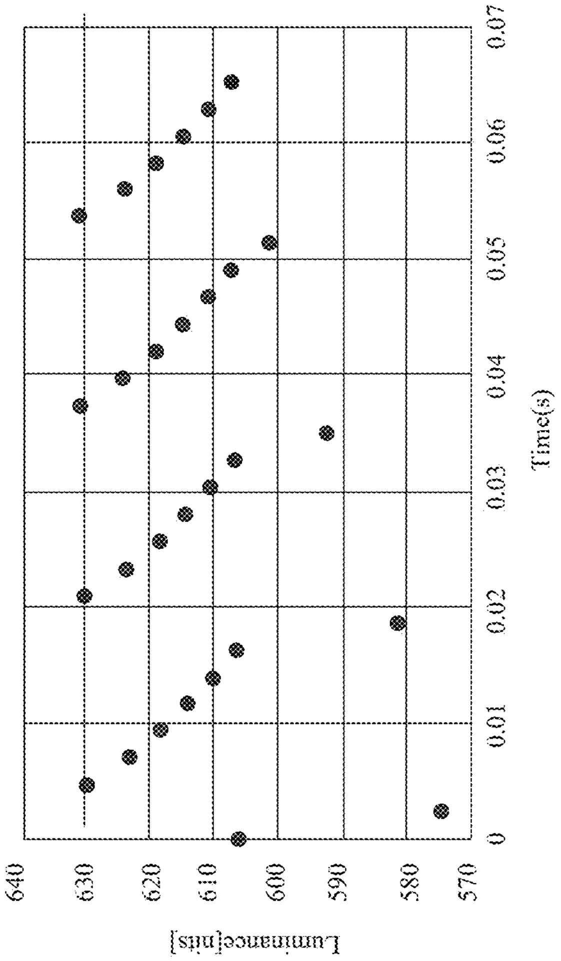
FIG. 3 shows a schematic diagram of reference data for displaying characteristics according to the present application.

According to an embodiment of the present application, the image characteristic in FIG. 2 may be sampled and used as the reference data of displaying characteristics, as shown in FIG. 3. Thereby, the amount of the reference data of displaying characteristics may be reduced. The reference data of displaying characteristics may be stored in the storage module 40 in advance. The storage module 40 is coupled to the compensation module 20 for providing the reference data of displaying characteristics to the compensation module 20.

When the compensation module 20 receives first display data, the first display data may be used to inquire the reference data of displaying characteristics for giving the variation of the first displaying characteristic of the first image corresponding to the first display data of the display panel 10 in a frame time and generating the first compensation signal. The first compensation signal is transmitted to the driving module 30. The driving module 30 generates the first driving signal according to the first compensation signal for driving the display panel 10 to display the first image in the first frame time. Namely, the driving module 30 adjusts the driving signal according to the compensation signal. For example, at some time, the voltage or current is increased for increasing the first displaying characteristic of the first image at the time and avoiding deterioration of the displaying quality by limiting the variation of the first displaying characteristic with time. In addition, according to an embodiment of the present application, the compensation module 20 may obtain the variation of the first displaying characteristic of the first image according to the variation of a current or a voltage of the display panel 10 while displaying the first image in the first frame time and hence generating the first compensation signal. Thereby, the variation of the first displaying characteristic may be obtained without referring to the reference data of displaying characteristics.

Figure 4:
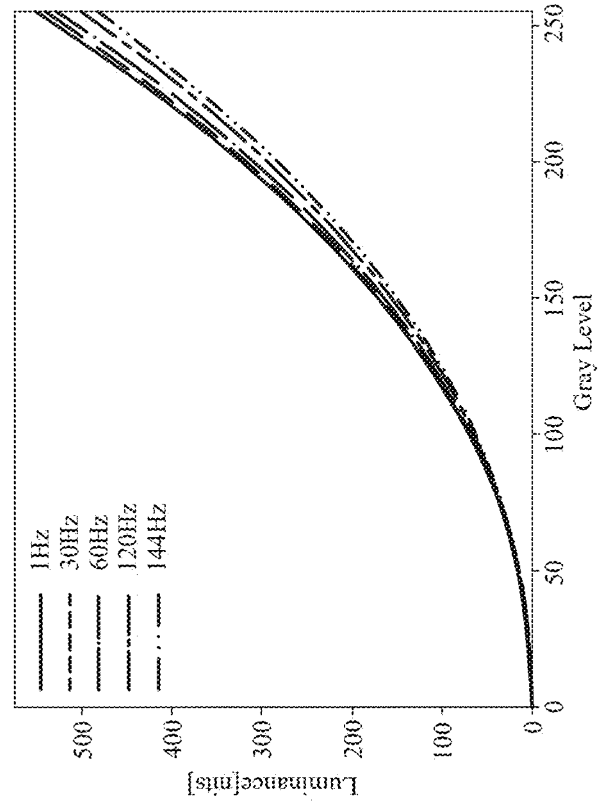
FIG. 4 shows a schematic diagram of target displaying characteristics corresponding to reference driving parameters according to the present application.

Please refer to FIG. 4, which shows a schematic diagram of target displaying characteristics corresponding to reference driving parameters according to the present application. FIG. 4 illustrates the corresponding displaying characteristics, for example, the luminance, of various gray levels of display data. Nonetheless, at different display frequencies, the corresponding luminance values are different even for the same gray level. The multiple curves shown in FIG. 4 represent the relation between gray level and luminance at different display frequencies, respectively. The gray level of display data indicates the magnitude of the driving signal generated by the driving module 30, for example, the magnitude of voltage or current. Thereby, gray levels are equivalent to driving parameters. According to the present application, the various curves in FIG. 4 are used as the driving reference data. The corresponding displaying characteristics and gray levels represent the corresponding target displaying characteristics and reference driving parameters, respectively. The compensation module 20 may inquire the driving reference data to get the corresponding target displaying characteristics according to the magnitude of the displaying characteristics to be enhanced. Thereby, the corresponding reference driving parameters, namely, the magnitude of the driving signal, of the target displaying characteristics may be obtained. Then the compensation module 20 may generate the first compensation signal according to the acquired driving parameters.

Figure 5:
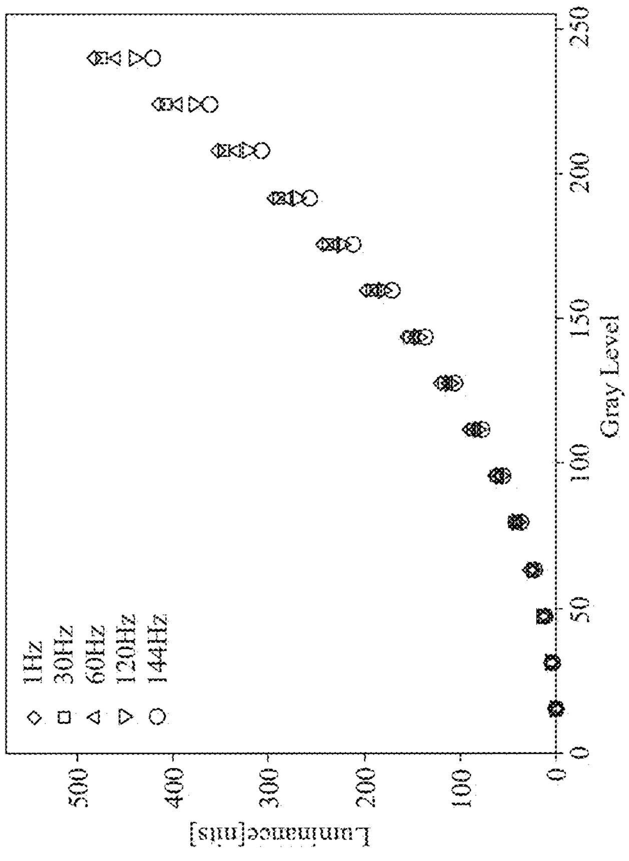
FIG. 5 shows a schematic diagram of reference data for displaying characteristics according to the present application.

According to an embodiment of the present application, the various curves in FIG. 4 are sampled and used as the driving reference data, as shown in FIG. 5. Thereby, the amount of the driving reference data may be reduced. The driving reference data may be stored in the storage module 40 in advance. The storage module 40 is coupled to the compensation module 20 for providing the driving reference data to the compensation module 20.

Figure 6:
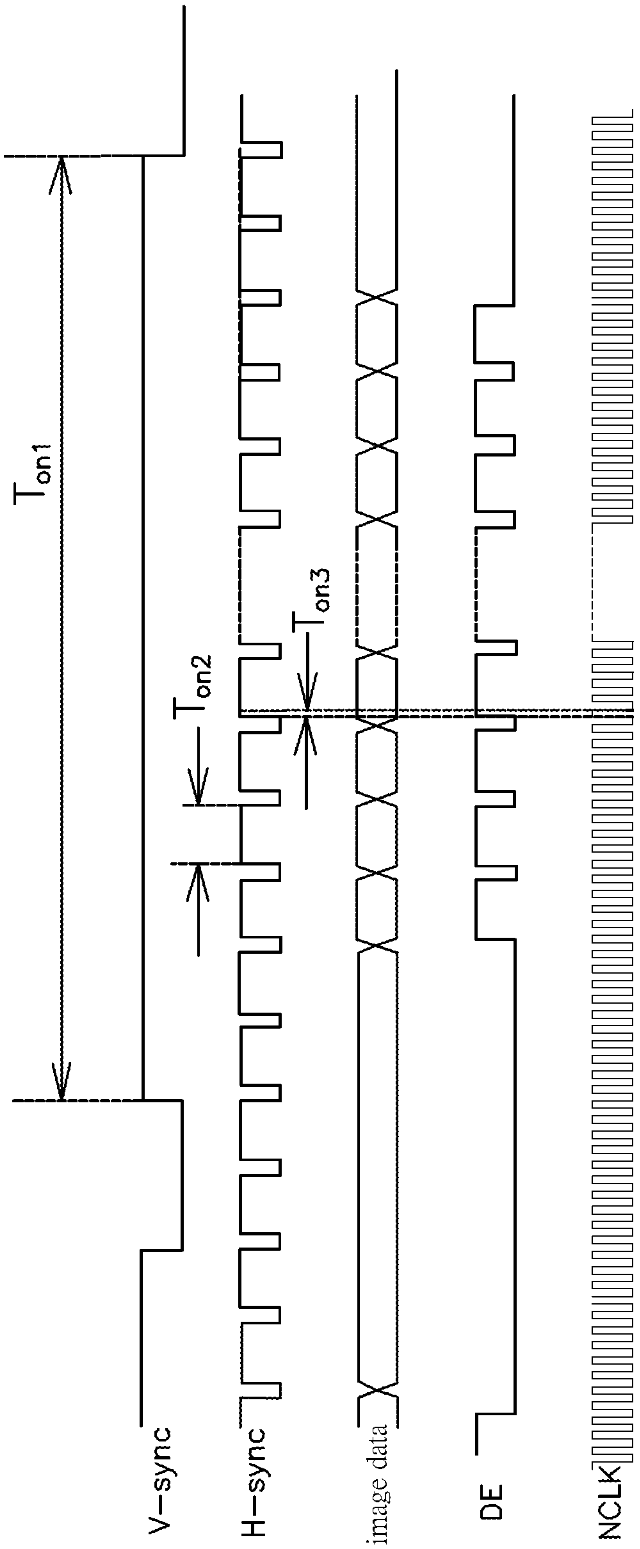
FIG. 6 shows a schematic diagram of how the operational module obtaining the display frequency according to the present application.

Please refer again to FIG. 1. The operational module 50 is coupled to the compensation module 20 and the storage module 40. The operational module 50 acquires the first display frequency of the first image according to the first display data stored in the storage module 40 and generates frequency data to the compensation module 20. The compensation module 20 may thus know that the first image corresponds to the first display frequency and then generates the first compensation signal according to the driving reference data. Please refer to FIG. 6, which shows a schematic diagram of how the operational module obtains the display frequency according to the present application. According to an embodiment of the present application, the display data include a vertical synchronization signal V-sync, a horizontal synchronization signal H-sync, image data, an enable signal DE, and a clock signal NCLK. A pulse width (the enable time $T_{on1}$) of the vertical synchronization signal V-sync represents a frame time. Thereby, the vertical synchronization signal V-sync represents the display frequency. Each pulse width (the enable time $T_{on2}$) of the horizontal synchronization signal H-sync represents the scan time of each scan line of the display panel 10. The frequency of the clock signal NCLK is higher than the frequency of the vertical synchronization signal V-sync and the frequency of the horizontal synchronization signal H-sync. That is to say, the pulse width (the enable time $T_{on1}$) of the clock signal NCLK is smaller than the pulse width of the vertical synchronization signal V-sync and the pulse width of the horizontal synchronization signal H-sync. The operational module 50 counts the pulse width of the vertical synchronization signal V-sync according to the clock signal NCLK to obtain the corresponding first display frequency of the first image. Alternatively, the operational module 50 counts the pulse width or pulse number of the horizontal synchronization signal H-sync according to the clock signal NCLK to obtain the corresponding first display frequency of the first image. The image data may be gray level data.

Figure 7A:
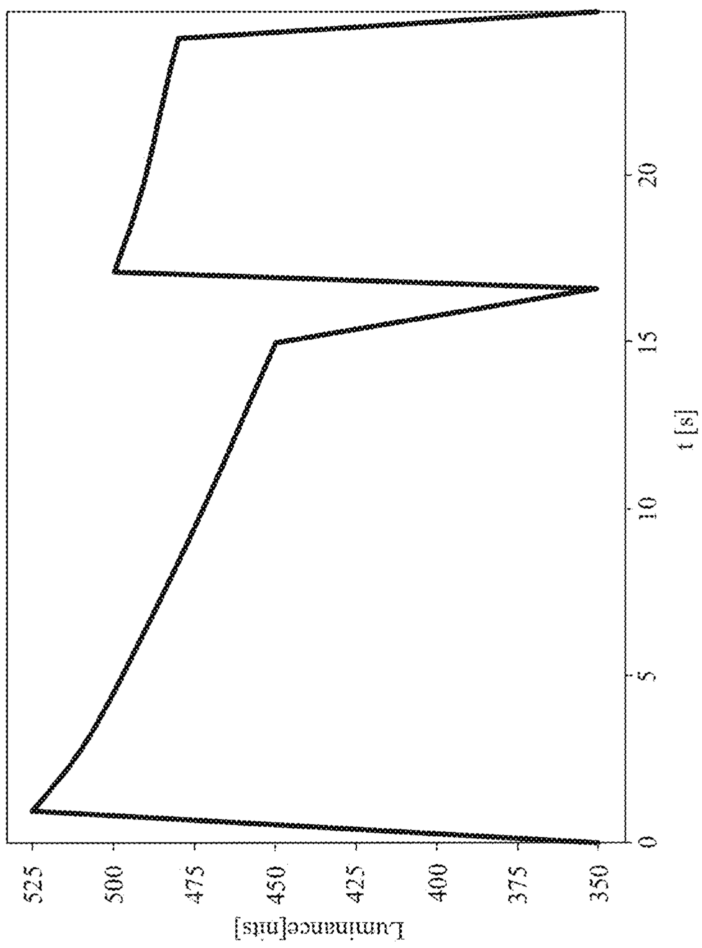
FIG. 7A and FIG. 7B show schematic diagrams of unadjusted displaying characteristics.
Figure 7B:
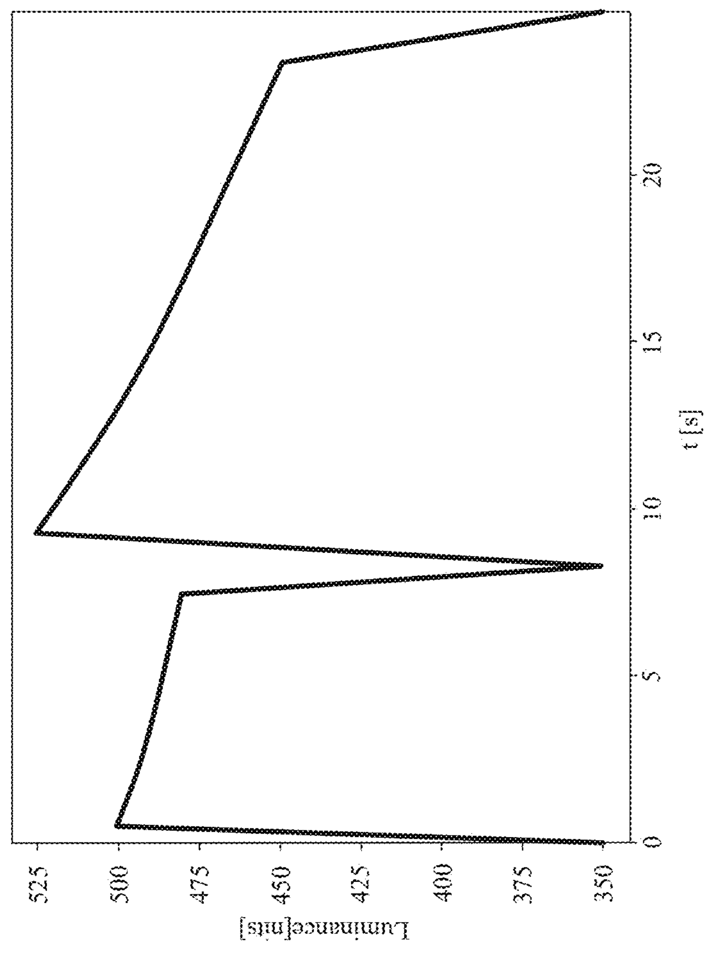

Please refer to FIG. 7A and FIG. 7B, which show schematic diagrams of unadjusted displaying characteristics. Both figures represent the first displaying characteristic of the first image and the second displaying characteristic of the second image, which the first image and the second image are displayed on the same one pixel of the display panel 10 in the first frame time and the second frame time. The first displaying characteristic in FIG. 7A corresponds to the first image with a low display frequency. The second displaying characteristic in FIG. 7A corresponds to the second image with a high display frequency. The first displaying characteristic in FIG. 7B corresponds to the first image with a high display frequency. The second displaying characteristic in FIG. 7B corresponds to the second image with a low display frequency. According to FIGS. 7A and 7B, it is known that both displaying characteristics will decrease with time. The initial value of displaying characteristic with a low display frequency is greater than the initial value of the displaying characteristic with a high display frequency. The final value of displaying characteristic with a low display frequency is smaller than the final value of the displaying characteristic with a high display frequency. Consequently, the variation of the displaying characteristic with a low display frequency is greater.

Figure 8A:
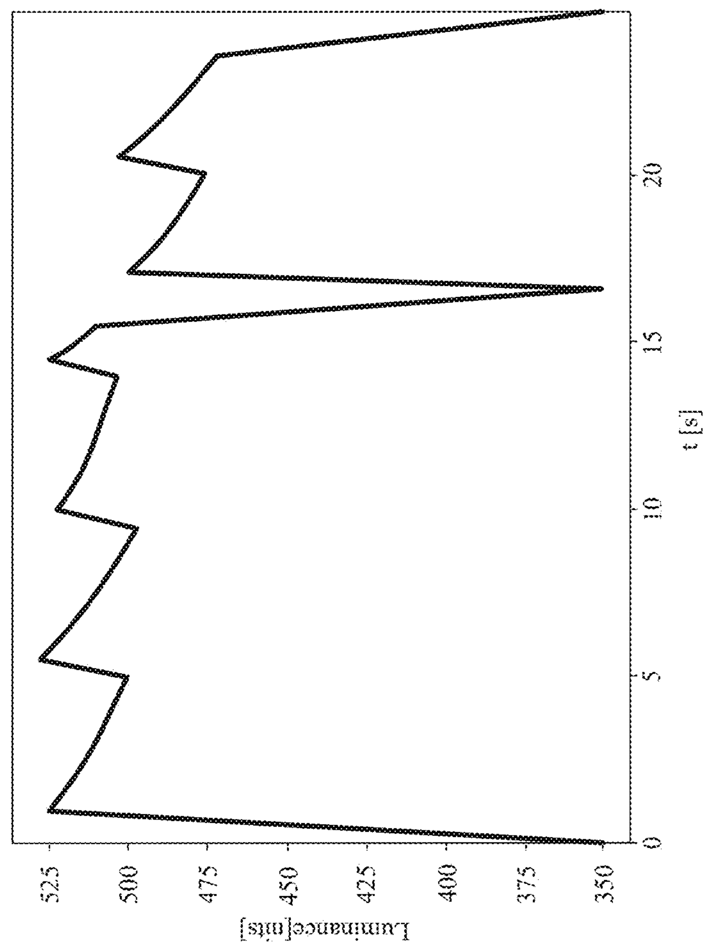
FIG. 8A and FIG. 8B show schematic diagrams of adjusted displaying characteristics according to an embodiment of the present application.
Figure 8B:
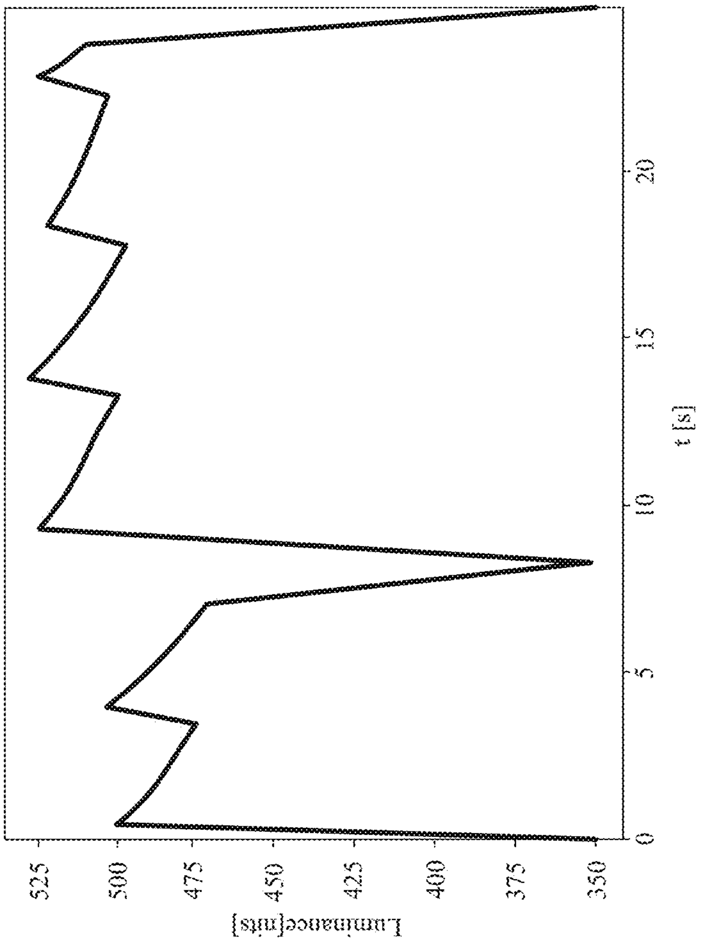

Please refer to FIG. 8A and FIG. 8B, which show schematic diagrams of adjusted displaying characteristics according to an embodiment of the present application. As described above, the compensation module 20 of the driving circuit according to the present application generates the compensation signal. The driving module 30 generates the driving signal according to the compensation signal, which is equivalent to adjusting the driving signal for adjusting the first displaying characteristic of the first image and the second displaying characteristic of the second image. As shown in FIG. 8A and FIG. 8B, as opposed to FIG. 7A and FIG. 7B, the variations of the first displaying characteristic and the second displaying characteristic decrease with time and thus improving the displaying quality. The method of adjusting the second displaying characteristic of the second image in the second frame time is the same as the method of adjusting the first displaying characteristic of the first image in the first frame time.

Figure 9A:
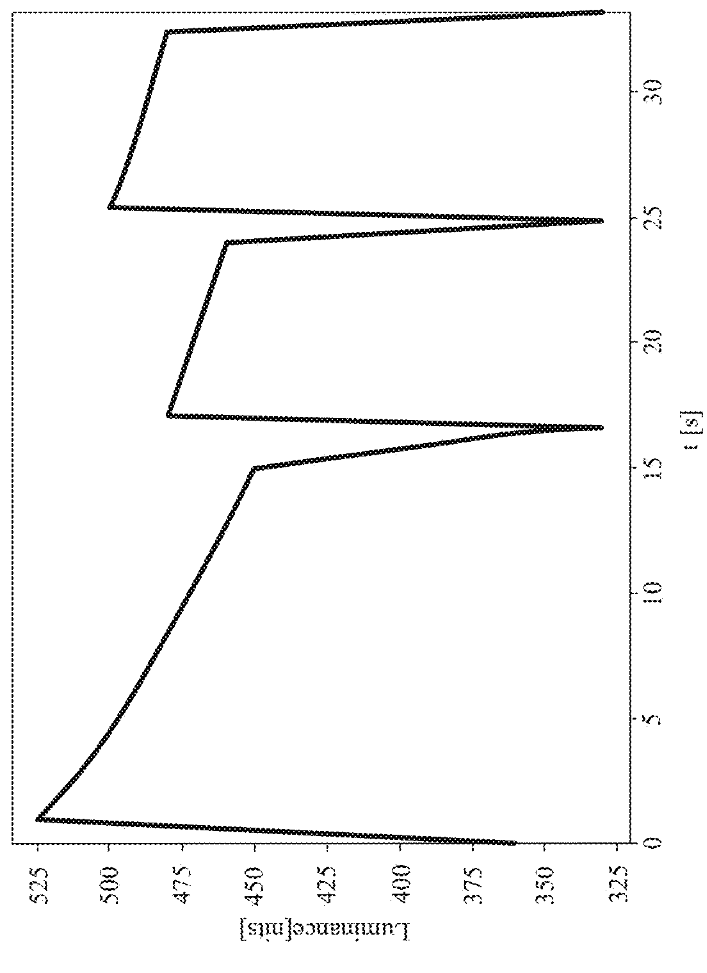
FIG. 9A and FIG. 9B show schematic diagrams of adjusted displaying characteristics according to another embodiment of the present application.
Figure 9B:
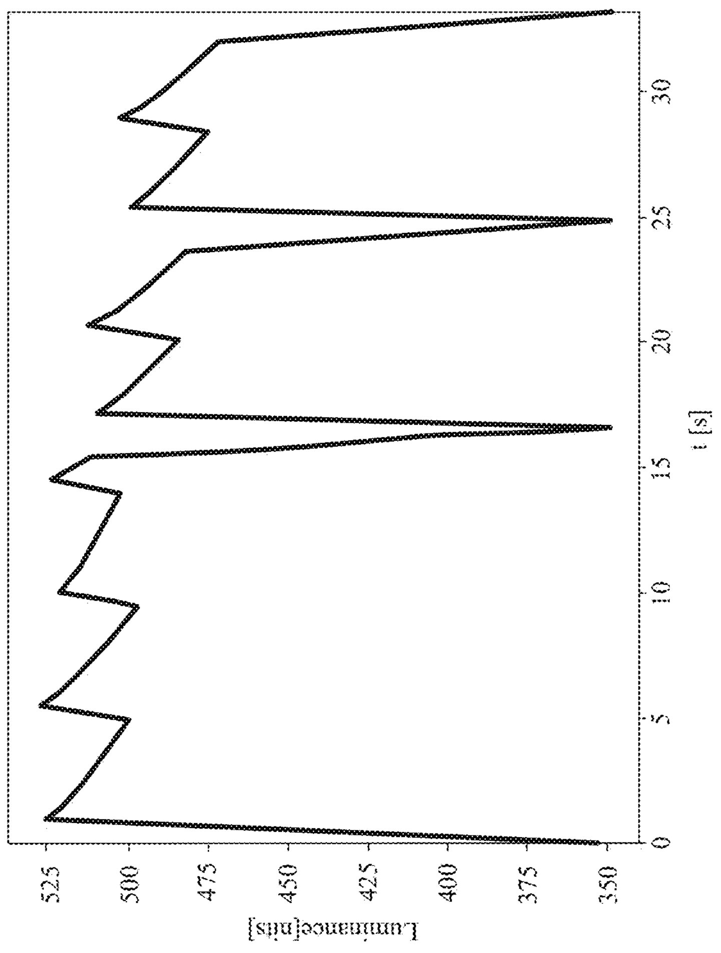

As shown in FIG. 7A and FIG. 7B, due to the difference in display frequency, namely, the difference between the first displaying characteristic in the first frame time and the second displaying characteristic in the second frame time is very large, in particular, between the final value of the first displaying characteristic and the initial value of the second displaying characteristic, a viewer will see flicker. Thereby, the compensation module 20 may generate the second compensation signal according to the difference between the first display frequency and the second display frequency. Then the driving module 30 generates the second driving signal according to the second compensation signal for driving the display panel 10 to display the second image in the second frame time and thus adjusting the second displaying characteristic. To avoid influence on the displaying quality owing to excessive adjustment, the second displaying characteristic and the third displaying characteristic in the third frame time may be adjusted evenly. As shown in FIG. 9A, the driving circuit according to the present application adjusts the second displaying characteristic and the third displaying characteristic. Moreover, in addition to generating the compensation signal according to the variation of displaying characteristic in a frame time, the compensation module 20 according to the present application may also generate the compensation signal according to the display frequency of the images at adjacent frame times for adjusting current displaying characteristic. As shown in FIG. 9B, the driving circuit also adjusts the second displaying characteristic in the second frame time and the third displaying characteristic in the third frame time.

Figure 10A:
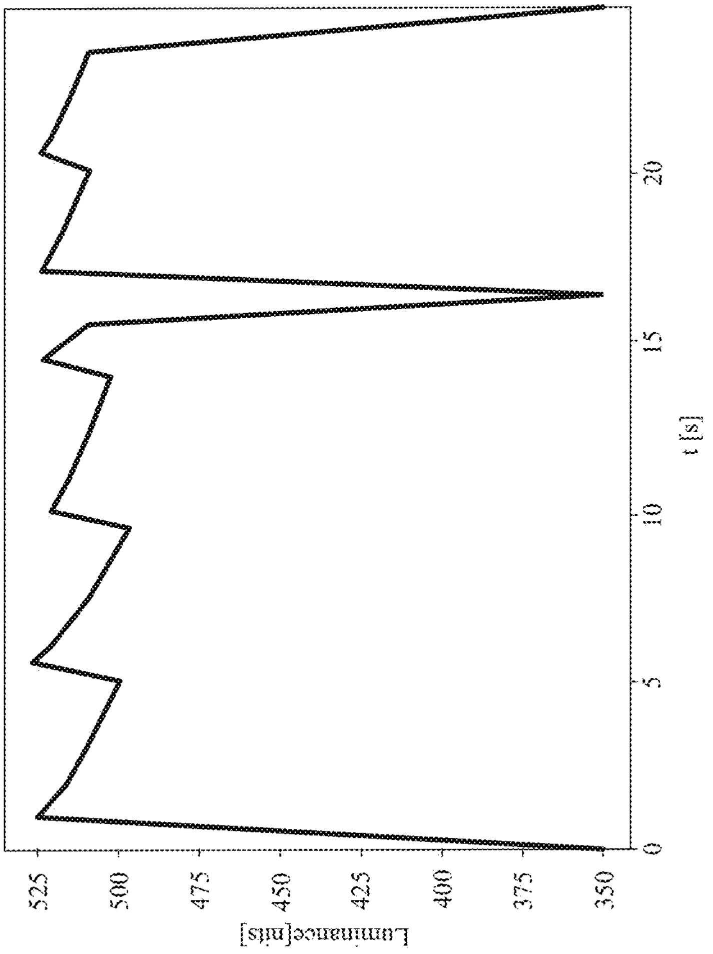
FIG. 10A and FIG. 10B show schematic diagrams of adjusted displaying characteristics according to a further embodiment of the present application.
Figure 10B:
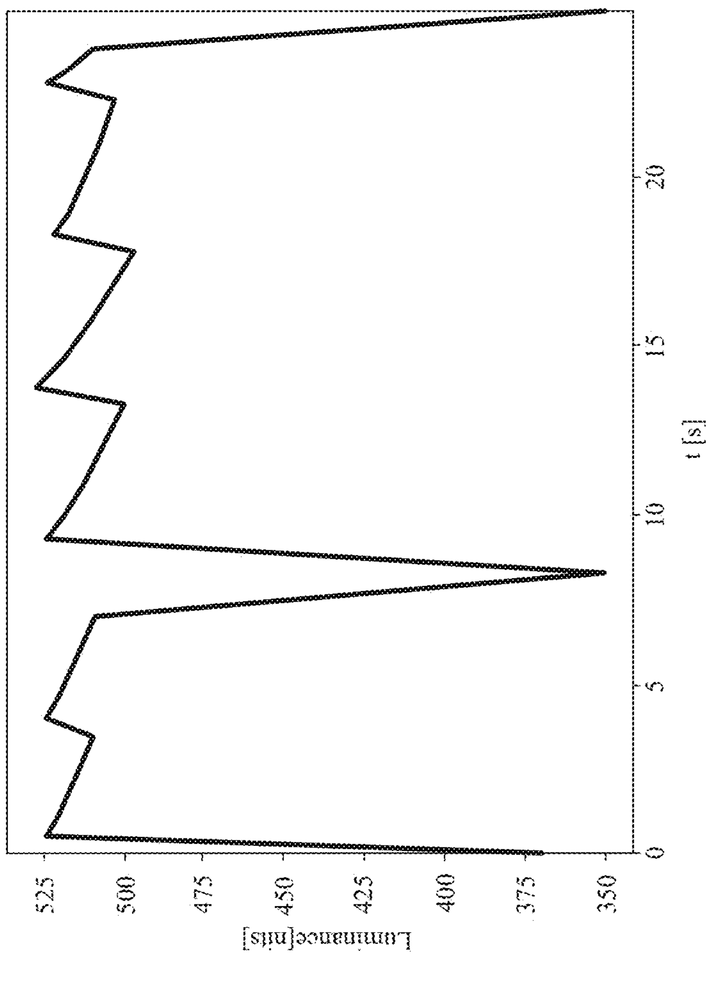

Besides, the compensation module according to the present application may adjust the second displaying characteristic according to the difference between the first displaying characteristic and the second displaying characteristic. For example, if the difference between the final value of the first displaying characteristic and the initial value of the second displaying characteristic exceeds a predetermined threshold value, the second displaying characteristic and/or the third displaying characteristic will be adjusted. As shown in FIG. 10A and FIG. 10B, the driving circuit according to the present application adjusts the second displaying characteristic in the second frame time for reducing the difference between the second displaying characteristic and the first displaying characteristic. In addition, the compensation module 20 may judge the correlation between the first image and the second image according to the first display data and the second display data. For example, if the difference in the gray level between the first display data and the second display data is not large, their correlation is large and then the second displaying characteristic of the second image may be adjusted correspondingly. Contrarily, if the difference in gray level is large, their correlation is small and then the second displaying characteristic may be maintained unadjusted.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A driving circuit for a display panel, comprising:

a compensation module, generating a first compensation signal according to a variation of a first displaying characteristic of a first image displayed on a mere pixel of said display panel in a frame time, said compensation module further generating a second compensation signal according to second display data; and a driving module, generating a first driving signal according to said first compensation signal for driving said pixel of said display panel to display said first image in a first frame time, said driving module generating a second driving signal according to said second compensation signal for driving said pixel of said display panel to display a second image corresponding to said second display data at a second frame time;

wherein said compensation module generates said second compensation signal according to the difference between said first displaying characteristic corresponding to said first image displayed on said pixel of said display panel and a second displaying characteristic corresponding to said second image displayed on said pixel of said display panel.

2. The driving circuit of claim 1, wherein said first displaying characteristic is a first display luminance; said second displaying characteristic is a second display luminance.

3. A driving circuit for a display panel, comprising:

a compensation module, generating a first compensation signal according to a variation of a first displaying characteristic of a first image displayed on a mere pixel of said display panel in a frame time, said compensation module further generating a second compensation signal according to second display data; and a driving module, generating a first driving signal according to said first compensation signal for driving said pixel of said display panel to display said first image in a first frame time, said driving module generating a second driving signal according to said second compensation signal for driving said pixel of said display panel to display a second image corresponding to said second display data at a second frame time;

wherein said compensation module generates said second compensation signal according to the difference between a first display frequency corresponding to said first image displayed on said pixel of said display panel and a second display frequency corresponding to said second image displayed on said pixel of said display panel;

said driving circuit further comprising:

an operational module, coupled to said compensation module, obtaining said first display frequency and said second display frequency according to first display data and said second display data, and generating frequency data to said compensation module.

4. A driving circuit for a display panel, comprising:

a compensation module, generating a first compensation signal according to a variation of a first displaying characteristic of a first image displayed on a mere pixel of said display panel in a frame time; and a driving module, generating a first driving signal according to said first compensation signal for driving said pixel of said display panel to display said first image in a first frame time;

wherein said compensation module obtains the variation of said first displaying characteristic of said first image displayed on said pixel of said display panel according to the variation of a current or a voltage of said display panel while displaying said first image on said pixel of said display panel in said first frame time.

5. A driving circuit for a display panel, comprising:

a compensation module, generating a first compensation signal according to a variation of a first displaying characteristic of a first image in a frame time; and a driving module, generating a first driving signal according to said first compensation signal for driving said display panel to display said first image in a first frame time;

wherein said compensation module obtains the variation of said first displaying characteristic of said first image displayed on said a pixel of said display panel in said frame time according to reference data of said displaying characteristics and first display data, and generates said first compensation signal; said reference data of said displaying characteristics includes the variation of said first displaying characteristic in said frame time; and said first image is corresponding to said first display data.

6. A driving circuit for a display panel, comprising:

a compensation module, generating a first compensation signal according to a variation of a first displaying characteristic of a first image in a frame time; and a driving module, generating a first driving signal according to said first compensation signal for driving said display panel to display said first image in a first frame time;

wherein said compensation module generates said first compensation signal according to driving reference data; said driving reference data include a plurality of target displaying characteristics and a plurality of reference driving parameters; and said reference driving parameters are corresponding to said target displaying characteristics.

* * * * *